US012653153B2

(12) United States Patent
Mandel

(10) Patent No.: US 12,653,153 B2
(45) Date of Patent: Jun. 16, 2026

(54) PROTECTIVE CANINE PAW COVER

(71) Applicant: SaraLynn Mandel, Elverta, CA (US)

(72) Inventor: SaraLynn Mandel, Elverta, CA (US)

( * ) Notice: Subject to any disclaimer, the term of this patent is extended or adjusted under 35 U.S.C. 154(b) by 73 days.

(21) Appl. No.: 18/747,163

(22) Filed: Jun. 18, 2024

(65) Prior Publication Data

US 2025/0380665 A1     Dec. 18, 2025

(51) Int. Cl.
*A01K 13/00*          (2006.01)

(52) U.S. Cl.
CPC ................................. *A01K 13/007* (2013.01)

(58) Field of Classification Search
CPC ..................................................... A01K 13/007
See application file for complete search history.

(56) References Cited

U.S. PATENT DOCUMENTS

| | | | | |
|---|---|---|---|---|
| 2,424,172 | A | * | 7/1947 | Huddleston .......... A01K 13/007 54/82 |
| 2,725,570 | A | * | 12/1955 | Penna ................ A41D 19/0013 2/163 |
| 5,140,709 | A | * | 8/1992 | Cohn ................ A41D 19/0013 2/163 |

| | | | | |
|---|---|---|---|---|
| 5,598,584 | A | * | 2/1997 | Da Grossa ......... A41D 19/0013 2/163 |
| 8,856,966 | B2 | * | 10/2014 | Doty ...................... A61H 7/003 2/163 |
| 10,791,709 | B1 | * | 10/2020 | Lawson ............... A01K 13/006 |
| 11,297,800 | B2 | * | 4/2022 | Paxton ................ A43B 13/223 |
| 11,369,083 | B1 | * | 6/2022 | Paxton ................ A43B 13/223 |
| 12,089,671 | B1 | * | 9/2024 | Williams ............. A41D 19/002 |
| 2005/0188925 | A1 | * | 9/2005 | Yun ........................ A43C 11/00 54/82 |
| 2006/0042563 | A1 | * | 3/2006 | Galloway ............ A01K 13/007 119/850 |
| 2013/0256162 | A1 | * | 10/2013 | Snyder ................... A01K 13/00 119/856 |
| 2020/0093095 | A1 | * | 3/2020 | Allami ................. A01K 13/007 |
| 2023/0020508 | A1 | * | 1/2023 | Mason ................. A01K 13/007 |
| 2024/0172724 | A1 | * | 5/2024 | Seuk ..................... A01K 13/007 |
| 2024/0188538 | A1 | * | 6/2024 | Perella ................. A01K 13/007 |
| 2025/0169470 | A1 | * | 5/2025 | Oh ........................ A01K 13/007 |

FOREIGN PATENT DOCUMENTS

| | | | | | |
|---|---|---|---|---|---|
| KR | 101976128 | B1 | * | 5/2019 | .......... A01K 13/007 |
| WO | WO-2014071462 | A1 | * | 5/2014 | .......... A01K 13/007 |

* cited by examiner

*Primary Examiner* — Morgan T Jordan

(74) *Attorney, Agent, or Firm* — SaraLynn Mandel

(57)          ABSTRACT

A protective cover for a canine's paw having openings in the bottom of the cover for protrusion of toenails of a canine's paw and a flexible element connected to each opening to receive the canine's toenails to allow the toenails to protrude and prevent entry of foreign objects into the protective cover.

5 Claims, 2 Drawing Sheets

PROTECTIVE CANINE PAW COVER

FIELD OF THE INVENTION

The present invention pertains to a protective cover for canine paws, and more specifically to a cover that permits the toenails of the canine's paw to protrude during movement of the canine, while preventing entry of foreign objects into the cover.

BACKGROUND OF THE INVENTION

The paws of canines, and in particular working canines, are exposed to discomfort and serious injuries to their paws from contact or insertion of foreign objects into their paws, extreme temperatures or from exposure to toxic substances. This can occur whether the canine is moving on ground outdoors or inside structures. Typical problematic objects outside are plant materials including foxtails and burrs, as well as metal and broken glass. Paw injuries can also occur from variations of the surface of the ground, including the presence of ice, rocks, gravel and other protruding objects. Exposure to temperature extremes, including excessive heat or cold, can also cause pain and injury. The toes of canine paws are particularly vulnerable to injury, as are the spaces between the toes, and the paw pads, where foreign objects can pierce or lodge causing discomfort and infection.

The toenails of canine paws, and in particular the center toenails, function to provide traction with the ground during movement, helping to propel the canine while walking, running and climbing. There is a canine boot having openings for the two center toenails to protrude that is open on the sides when worn (Auburn-leathercraft). However, this boot has openings around the toenails and sides of the inserted canine paw, allowing foreign objects to insert into and between the canine's toes and into the paw pads, and contact of the paw with conditions on the ground. In addition, the canine's toenails are not secured in the openings of this boot during use, providing no resistance to the withdrawal of the nails from the toe openings during movement.

There remains a need for a protective covering for canine paws that protects the paw from pain and injury yet does not impede the movement and function of the toenails for traction with the surface upon which it is moving.

The preceding discussion of the background in the present disclosure is intended only to facilitate an understanding of the present disclosure. The discussion is not an acknowledgment or admission that any of the material referred to was part of the common general knowledge in the art as at the priority date of the application.

SUMMARY OF THE INVENTION

The canine paw protective cover of the invention includes a an open top sized and shaped to receive shaped and sized to receive at least a portion of the leg of a canine and a bottom shaped and sized to receive the paw of the canine, the bottom having at least one opening for protrusion of at least one toenail of a toe of the canine's paw when inserted into the bottom of the protective cover and at least one flexible element surrounding the at least one opening in the bottom of the protective cover that grips the base of the at least one toenail preventing entry of foreign objects and permitting independent movement of the toe relative to the paw.

In an implementation of the protective cover of the invention, the bottom of the protective cover is configured to increase traction between the bottom and the surface under the canine's paw. The bottom of the protective cover may be configured to include protruding treads or recessed grooves.

In another implementation of the protective cover of the invention, the bottom of the protective cover includes two openings for protrusion of the two toenails of the central toes of the canine's paw and two flexible elements surrounding each opening, when the canine's paw is inserted into the bottom of the protective cover.

In yet another implementation of the protective cover of the invention, the flexible element is a ring of flexible material.

In still another implementation of the protective cover of the invention, the flexible element is a tube of flexible material.

In an additional implementation of the protective cover of the invention, fastening elements are attached to the top of the protective cover for securing the protective cover to the leg and paw of the canine.

An implementation of the protective cover of the invention is a protective cover having a top portion shaped and sized to receive at least a portion of the leg of a canine, a separate bottom portion shaped and sized to receive the paw of the canine having at least one opening for protrusion of at least one toenail of a toe of the canine's paw when inserted into the opening in the bottom of the protective cover; and at least one flexible element connected to the at least one opening in the bottom portion, that grips the base of the at least one toenail preventing entry of foreign objects and permitting independent movement of the toe relative to the paw.

In still another implementation of the protective cover of the invention, fastening elements are attached to the top of the protective cover for securing the protective cover to the leg and paw of the canine.

Other objects, advantages and features of the present invention are or will become more apparent to one with skill in the art upon review of the following figures and non-restrictive detailed description. It is intended that all such additional objects, advantages and features of the invention be included within this description and within the scope of the invention and be protected by the accompanying claims.

DESCRIPTION OF THE INVENTION

The present invention is illustrated in further detail by the following non-limiting description.

Figure 1A:
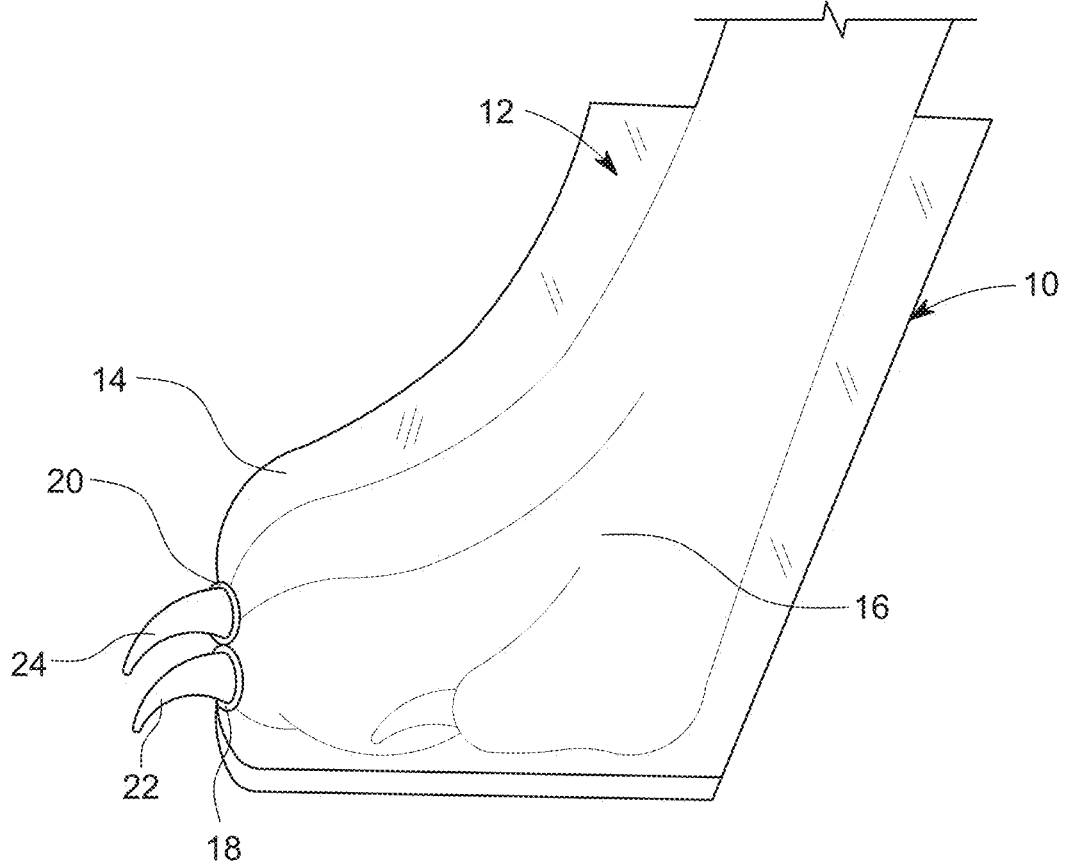
FIG. 1A is a side view of an implementation of the canine protective cover of the invention having an open top for receiving a portion of the lower leg of a canine and a bottom for receiving the paw of a canine and having two openings having a flexible element attached to both openings for protrusion of two central toenails of the canine paw when inserted into the protective cover.
Figure 1B:
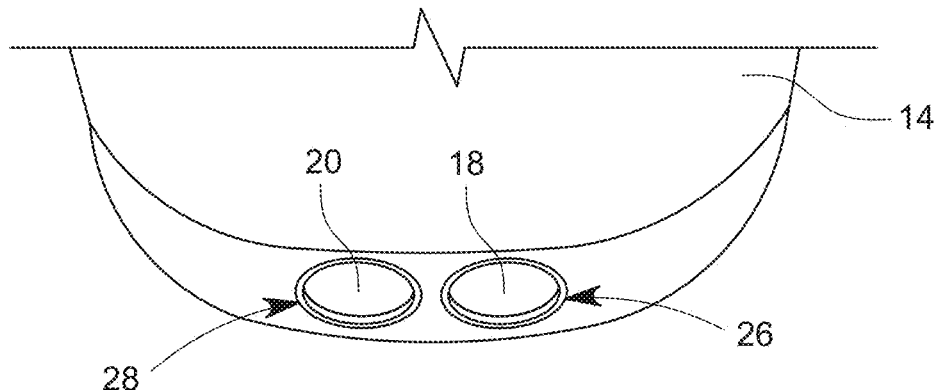
FIG. 1B is an enlarged front view of the openings in the bottom of the implementation of the protective cover of the invention as depicted in FIG. 1A, showing the flexible elements formed as rings around each opening, as described in more detail infra.
Figure 1C:
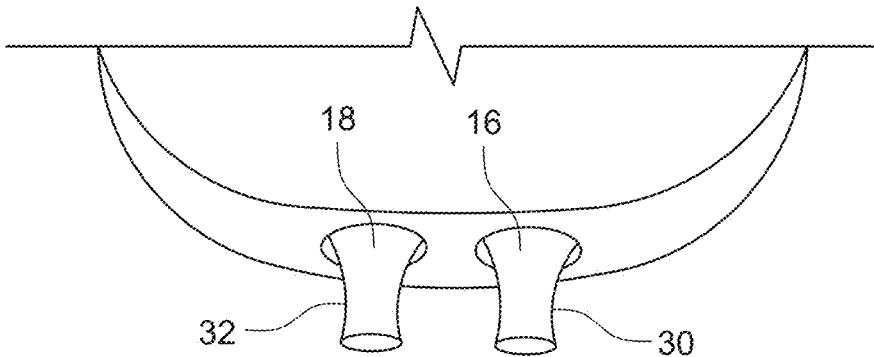
FIG. 1C illustrates an enlarged front view of the openings in the bottom of an implementation of the protective cover of the invention as depicted in FIG. 1A, showing an alternative implementation wherein a flexible element extends from each opening, as described in more detail infra.

Referring now to FIG. 1A, an implementation of the protective cover 10 of the invention is shown viewed from the side, having top 12 that is open for attaching to at least a portion of the leg of a canine and a bottom 14 for receiving a canine paw 16 of the leg of the canine. The bottom 14 of the protective cover 10 in this implementation has two openings 18 and 20 that allow toenails 22 and 24 of the central toes of the canine paw 14 to protrude from the protective cover 10. As shown in FIG. 1B showing an enlarged front view of the bottom 14 of the protective cover 10 of the invention, flexible elements 26 and 28 are formed as rings attached to the inside or outside of the protective cover 10 around each opening 18 and 20. Flexible elements 26 and 28 flexibly grip the base of toenails 22 and 24 of the canine paw 14 (FIG. 1A) that protrude through the openings 18 and 20 when the canine paw is inserted into the protective cover 10. The flexible elements 26 and 28 may be grommets, rings or gaskets and may be made of silicone, rubber, silicone or other synthetics and/or natural materials. Alternatively, as depicted in FIG. 1C, the flexible elements may be extended straight or tapered tubes 30 and 32 that flexibly grip the base of canine toenails which protrude through the openings in the bottom of the protective cover 10.

The material used for the flexible elements must be sufficiently flexible to permit independent movement of the toe independently of the canine paw, while wearing the protective cover and to accommodate variations in thickness of a canine's toenails. The flexible elements prevent insertion of foreign objects into the canine's toes, pads or other areas of the paw. In addition, the flexible elements allow the inserted canine toenail(s) to contact the ground and move naturally during wear to provide proprioception, a form of kinesthesia during the canine's movement and prevent injury to the toenails or toes. The flexible elements may also assist in preventing withdrawal of the nails and canine paw from the protective cover during wear and movement.

In alternative implementations of the invention, the openings for the canine paw's toenails may be modified by the use of threading sewn around the edges of the openings.

Fastening means may be used to secure the protective cover over the canine paw. In an implementation the top of the protective cover is secured with straps that are wrapped around the cover in one or more location, for example affixed to the top, bottom or both top and bottom of the protective cover, or are supplied separately, unattached to the top and/or bottom of the protective cover. The straps may be secured by Velcro® (hook and loop) strips or other fastening components. In an implementation (not shown), the top of the protective cover may be configured as opposing flaps which are secured with fastening components such as mating Velcro® strips attached to the inner surface of one flap and to the outer surface of the opposing flap. Alternative fastening components include, but are not limited to laces placed in holes on opposing flaps of the top of the protective cover, mating hook and loop materials, snap studs and caps, a zipper or other secure fastening components. While FIG. 1A depicts the protective cover as a single unit having a top and bottom, the top and bottom of the protective cover may be configured as separate pieces which are attached separately to the leg and paw of a canine or are attached together by fastening components before inserting the leg and paw of a canine into the protective cover.

In still another implementation, the protective cover is shaped as a sock or stocking having at least one opening with at least one flexible elements for protrusion of at least one toenail of the canine's paw when the canine's paw is inserted into the sock or stocking, which is pulled up the canine's leg.

The protective cover of the invention may be manufactured in sizes from small to large or may be custom made for specific needs dictated by a canine's paw and toenail sizes, or for injured paws having bandaging that changes the size or shape of the paw.

The protective covers of the invention may be manufactured from durable, weatherproof and/or breathable materials including, but not limited to leather, and other fabrics such as Cordura®, ripstop nylon, Gore-Tex®, Kevlar®, Dyneema®, silicone, rubber, canvas and other synthetic or natural materials. A breathable, waterproof, tear and puncture resistant fabric, provides advantages for long wear times, in different weather conditions, including extreme temperatures. The bottom surface of the bottom of the protective cover may be constructed of a material which improves shock absorption, such as Vibram®. The materials used for construction of the protective cover of the invention may be such that the cover is reusable, disposable after one use or may be recycled.

Additional implementations of the invention include configuring the bottom of the protective cover to improve traction on different surfaces, for example forming raised treads or recessed grooves on the bottom surface of the bottom of the protective cover.

The protective canine cover of the invention may include additional features for comfort, such as lining the inside surfaces of the cover with material that provides cushioning, absorption, warmth and/or wicking, and/or by providing padding under the paw pads.

The foregoing description of implementations of the invention has been presented for purposes of illustration and description. It is not exhaustive and does not limit the claimed invention to the precise forms disclosed. For example, those skilled in the art will recognize that additional modifications to the openings in the protective cover for the toenails to protrude may be made to flexibly grip the base of the toenails, without departing from the scope of the invention. Accordingly, modifications and variations are possible in light of the above description or may be acquired from practicing the invention. The claims and their equivalents define the scope of the invention.

I claim:

1. A canine paw protective cover consisting of:
   a) an open top shaped and sized to receive at least a portion of the leg of a canine and a bottom shaped and sized to receive the paw of the canine, the bottom having two openings for protrusion of each of the toenails of two toes of the canine's paw when inserted into the bottom of the protective cover; and
   b) two flexible open tubes attached to the inside or outside surface of the bottom and surrounding each opening in the bottom of the protective cover that grips the base of each protruding toenail preventing entry of foreign objects and permitting independent movement of each toe relative to the paw.

2. The protective cover of claim 1, wherein the bottom of the protective cover is configured to increase traction between the bottom and the surface under the canine's paw.

3. The protective cover of claim 2, wherein the bottom of the protective cover is configured to include protruding treads or recessed grooves.

4. The paw protective cover of claim 1, further comprising fastening elements attached to the top of the protective cover for securing the protective cover to the leg and paw of the canine.

5. A canine paw protective cover consisting of a) a top portion shaped and sized to receive at least a portion of the leg of a canine;

b) a separate bottom portion shaped and sized to receive the paw of the canine having two openings for protrusion of two toenails of two toes of the canine's paw when inserted into the opening in the bottom of the protective cover; and c) two flexible open tubes, each tube attached to the inside or outside surface of the bottom and surrounding each opening in the bottom of the protective cover that grips the base of each protruding toenail preventing entry of foreign objects and permitting independent movement of the toe relative to the paw.

\* \* \* \* \*